United States Patent
Doe et al.

(10) Patent No.: US 9,319,319 B2
(45) Date of Patent: Apr. 19, 2016

(54) COMMUNICATION NETWORK TRAFFIC CONTROL ELEMENT

(75) Inventors: Stephen Richard Doe, Christchurch (GB); Robert John Salter, Christchurch (GB)

(73) Assignee: BAE SYSTEMS PLC, London (GB)

( * ) Notice: Subject to any disclaimer, the term of this patent is extended or adjusted under 35 U.S.C. 154(b) by 334 days.

(21) Appl. No.: 13/989,289

(22) PCT Filed: Nov. 4, 2011

(86) PCT No.: PCT/EP2011/069441
§ 371 (c)(1),
(2), (4) Date: Aug. 15, 2013

(87) PCT Pub. No.: WO2012/069303
PCT Pub. Date: May 31, 2012

(65) Prior Publication Data
US 2013/0315064 A1    Nov. 28, 2013

(30) Foreign Application Priority Data

Nov. 23, 2010   (EP) .................................... 10275118
Nov. 23, 2010   (GB) .................................... 1019823

(51) Int. Cl.
*H04L 12/801* (2013.01)
*H04L 12/24* (2006.01)
*H04L 12/835* (2013.01)

(52) U.S. Cl.
CPC ............... *H04L 47/10* (2013.01); *H04L 47/30* (2013.01)

(58) Field of Classification Search
CPC ........................... H04L 47/10; H04L 47/2441
USPC ........................................................ 370/235
See application file for complete search history.

(56) References Cited

U.S. PATENT DOCUMENTS

| | | | | |
|---|---|---|---|---|
| 6,067,298 | A * | 5/2000 | Shinohara | H04L 49/105 370/236 |
| 2002/0118645 | A1 * | 8/2002 | Narayana | H04L 12/5693 370/231 |
| 2004/0125809 | A1 | 7/2004 | Jeng | |
| 2004/0165588 | A1 * | 8/2004 | Pandya | H04L 63/0218 370/389 |
| 2005/0175031 | A1 | 8/2005 | Harley, Jr. | |
| 2006/0067225 | A1 | 3/2006 | Fedorkow et al. | |

OTHER PUBLICATIONS

International Preliminary Report on Patentability (PCT/IB/373) issued on May 28, 2013, by the European Patent Office as the International Searching Authority for International Application No. PCT/EP2011/069441.

(Continued)

*Primary Examiner* — Ronald B Abelson
(74) *Attorney, Agent, or Firm* — Maine Cernota & Rardin

(57) ABSTRACT

A communication network traffic control element is disclosed which is arranged to receive traffic, such as voice and data, as a plurality of discrete traffic packets at an input and communicate the traffic as a serial traffic stream to an output. The traffic control element can include a receiver which is arranged to receive the traffic packets, and a processor which is arranged to communicate the serial traffic stream to the output. The processor can include a buffer to vary a traffic output rate from the processor independently of an input rate of traffic flow to the receiver.

17 Claims, 3 Drawing Sheets

(56) References Cited

OTHER PUBLICATIONS

International Search Report (PCT/ISA/210) issued on Feb. 6, 2012, by the European Patent Office as the International Searching Authority for International Application No. PCT/EP2011/069441.

Search Report issued on Mar. 1, 2011, by the European Patent Office for Application No. 10275118.7.

Search Report issued on Mar. 16, 2011, by the British Patent Office for Application No. 1019823.2.

\* cited by examiner

COMMUNICATION NETWORK TRAFFIC CONTROL ELEMENT

RELATED APPLICATIONS

This application is a national phase application filed under 35 USC §371 of PCT Application No. PCT/EP11/69441 with an International filing date of Nov. 4, 2011 which claims priority of GB Patent Application 1019823.2 filed Nov. 23, 2010 and EP Patent Application 10275118.7 filed Nov. 23, 2010. Each of these applications is herein incorporated by reference in its entirety for all purposes.

FIELD OF THE INVENTION

The present invention relates to a communication network traffic control element and particularly, but not exclusively to a communication network traffic control element which is arranged to receive traffic as a plurality of discrete traffic packets at an input and communicating the traffic as a serial traffic stream to an output.

BACKGROUND OF THE INVENTION

In order to transmit discrete packets of traffic, such as voice and data packets configured to the Transmission Control Protocol/Internet Protocol (TCP/IP), over a serial communications link, such as a radio link, it is necessary to first convert the packets of traffic into a serial traffic stream. This involves limiting the flow of traffic to a router, for example, to avoid a congestion of traffic developing upstream of the traffic conversion process and which may otherwise lead to a failure of the delivery of the traffic. Modern systems for implementing this conversion comprise a serial conversion card and a router, however, given the large mismatch in traffic delivery and transmission, it is often necessary to use a large router having significant processing capability, which occupies a significant volume of space.

When sending traffic, such as a data or voice message over a communications link it is also desirable to process the traffic prior to transmission to include error correction facilities so that in the event that a portion of the communicated message becomes lost or corrupt, the message can be recovered. In certain situations it is also desirable to encrypt the traffic to mask the content, and the source and destination of the traffic. The processing of the message to enable error correction and the encryption of the message however, increases the computational size of the message which can further add to the undesirable build up of traffic for subsequent transmission.

SUMMARY OF THE INVENTION

In accordance with the present invention as seen from a first aspect, there is provided a communication network traffic control element which is arranged to receive traffic as a plurality of discrete traffic packets at an input and communicate the traffic as a serial traffic stream to an output, the traffic control element comprising a receiver which is arranged to receive the traffic packets, and a processor which is arranged to process the traffic to convert the discrete traffic packets to a serial traffic stream and communicate the serial traffic stream to the output, the processor comprising a buffer which is arranged to receive traffic from the receiver and to control a rate of traffic flow from the receiver to the processor to enable a rate of traffic output from the processor to be varied independently of a rate of traffic input to the receiver.

Advantageously, the buffer of the processor coordinates and controls the transfer of traffic into and out therefrom so that the receiver and processor do not become overloaded with traffic.

The buffer is preferably arranged to receive traffic from the receiver in accordance with a traffic request signal which is communicated from the buffer to the receiver.

Preferably, the traffic control element further comprises a library of traffic processing schemes, which are selectively arranged to process the traffic before subsequent communication to the output. One or more of the traffic processing schemes are preferably uploadable to the processor for subsequent traffic processing.

The buffer is preferably further arranged to temporarily hold the traffic from the receiver. Preferably, the buffer comprises a temporary memory store.

The traffic control element preferably further comprises a control device for controlling the traffic processing scheme which is to be applied to the traffic.

Preferably, the traffic control element comprises a plurality of processors and an output associated with each processor. The control device is preferably further arranged to selectively determine the processing scheme which is to be uploaded to the respective processor.

Preferably, the or each processor comprises a field programmable gate array.

The discrete traffic packets preferably comprise traffic configured according to an Internet Protocol or a Transmission Control Protocol, or a combination of both an Internet Protocol and a Transmission Control Protocol.

Preferably, the traffic comprises data traffic or voice traffic or a combination of both.

In accordance with the present invention as seen from a second aspect, there is provided a method of communicating traffic received as a plurality of discrete traffic packets at an input, as a serial traffic stream to an output, the method comprising the steps of:

receiving traffic as a plurality of discrete traffic packets at a receiver;
controlling a flow of traffic from the receiver to a buffer associated with a processor;
converting the discrete traffic packets to a serial traffic stream using the processor; and,
communicating the traffic from the processor at a traffic flow rate independently of a traffic flow rate into the receiver, to an output.

Preferably, the buffer comprises a temporary memory store which, during use, is maintained substantially filled with traffic, such that as traffic is taken therefrom by the processor, further traffic is arranged to pass from the receiver into the buffer.

The method preferably further comprises transferring traffic from the receiver to the buffer in accordance with a traffic request signal from the buffer.

Preferably, the traffic request signal is communicated to the receiver in dependence on an availability of memory space within the buffer. In this respect, once memory space within the buffer becomes available following the removal of traffic from the buffer to the processor, the buffer is arranged to request that further traffic is sent from the receiver to the buffer.

Further preferred features of the method of the second aspect, may comprise one or more of the preferred features of the communication network traffic control element of the first aspect.

BRIEF DESCRIPTION OF THE DRAWINGS

An embodiment of the present invention will now be described by way of an example only and with reference to the accompanying drawings, in which.

DETAILED DESCRIPTION

Figure 1:
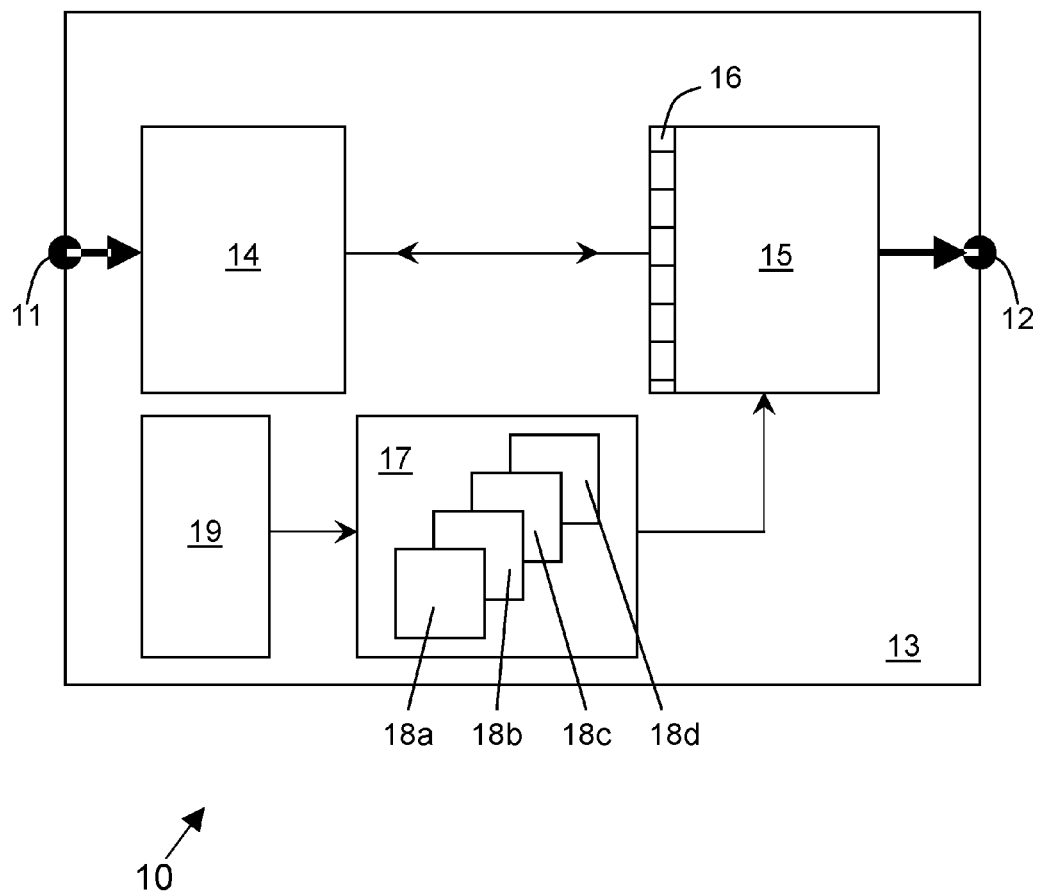
FIG. 1 is a schematic illustration of a communication network traffic control element according to a first embodiment of the present invention.

Referring to FIG. 1 of the drawings there is illustrated a communication network traffic control element 10 according to a first embodiment of the present invention. The element 10 is arranged to receive traffic, such as data and voice, as a plurality of discrete traffic packets at an input 11, convert the traffic packets to a serial traffic stream and subsequently pass the serial traffic stream to an output 12 for subsequent transmission over a communications link (not shown). The element 10 is further arranged to process the traffic prior to subsequent transmission to harden or otherwise make the traffic more resilient to traffic corruption, communication errors and interference from potential sources of jamming.

The element 10 illustrated in FIG. 1 comprises a printed circuit board 13 upon which is mounted a receiver 14 which is arranged to receive the traffic packets configured to a communication protocol, such as the Internet Protocol (IP), Transmission Control Protocol (TCP) or a combination of both, namely TCP/IP. The traffic is received at the input port 11, such as an Ethernet connection (not shown) which provides a standard electrical connection to the receiver 14 which itself may comprise an Ethernet physical transceiver or Ethernet PHY, from a router (not shown) for example, at a rate of typically 100 Mbps.

The element 10 further comprises a processor, such as field programmable gate array (FPGA) 15 mounted upon the printed circuit board 13, and comprises a temporary memory store or buffer 16. The FPGA 15 is arranged to receive traffic from the receiver 14 into the buffer 16 at a rate determined by the buffer 16. In this respect, the buffer is arranged to transmit a traffic request signal to the receiver requesting that further traffic is sent to the buffer, as memory space within the buffer becomes available. If there is no memory space available within the buffer 16 to accommodate further traffic, then the buffer 16 is arranged to withhold the transmission of the traffic request signal to prevent the transfer of further traffic to the buffer 16. The traffic held within the buffer 16 is extracted by the FPGA 15, which is still configured in packets and converts the traffic packets into a serial traffic stream for subsequent output to the output port 12 of the element 10. The traffic is taken from the buffer 16 and converted to a serial stream at a rate determined by the buffer 16, to control the rate at which traffic is subsequently passed to the output port 12. In addition, the buffer 16 controls the flow of traffic into and out therefrom to maintain a substantially filled memory store.

The traffic control element 10 further comprises a library 17 of traffic processing schemes 18a-d, which are selectively applied to the traffic in accordance with signals received as input from a management control device 19. In the present embodiment, the library 17 of traffic processing schemes 18 is embodied on an erasable programmable device, such as an erasable programmable read only memory microchip (not shown). The control device 19 may comprise a user access terminal (not shown) for example, which enables a user to selectively control the processing scheme or schemes 18a-d which is/are to be applied to the traffic from the library, before passing the traffic to the output port 12 for transmission over the communications link (not shown). The control device 19 may be further arranged to program the FPGA 15 in accordance with a preferred process of traffic serialisation, for example.

Figure 2:
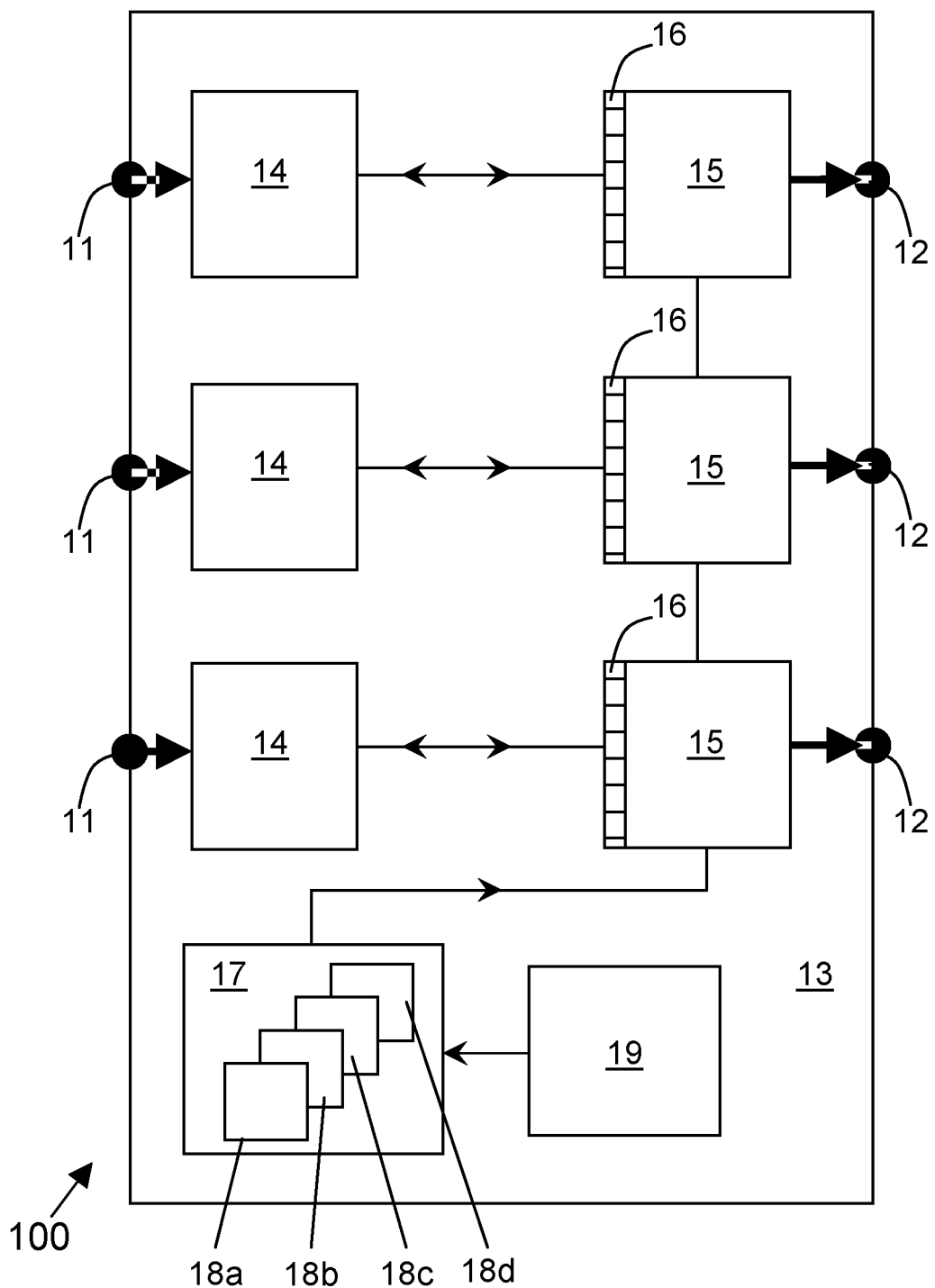
FIG. 2 is a schematic illustration of a communication network traffic control element according to a second embodiment of the present invention; and, FIG. 3 is a flowchart illustrating the sequence of steps associated with a method of communicating traffic according to an embodiment of the present invention.

Referring to FIG. 2 of the drawings, there is illustrated a communication network traffic control element 100 according to a second embodiment of the present invention. The element 100 of the second aspect is substantially the same as the element 10 of the first aspect and so like features have been referenced using like reference numbers. The element 100 of the second aspect however, comprises two additional FPGA's 15 which are separately arranged to receive traffic packets at their respective buffer 16 from a respective receiver 14. Each FPGA 15 comprises a separate traffic outlet port 12 such that the traffic control element 100 of the second aspect provides three discrete traffic packet input ports and three serial traffic stream output ports 12 for connecting to a serial communications link (not shown), such as a radio link. The traffic held within each FPGA 15 is further arranged to undergo one or more traffic processing schemes 18a-d in accordance with the signals received from the control device 19. In this manner, the element 100 enables each FPGA 15 to process traffic independently of the other FPGA's 15, so that the traffic in one FPGA 15 for example, may undergo more extensive error correction than traffic held in another FPGA 15. The buffers 16 therefore enable the traffic flow rates into and therefrom to be controlled in accordance with the traffic processing scheme which is applied to the traffic for example, to avoid a bottleneck of traffic building up at the buffer and thus to provide a controlled traffic flow rate from the respective outlet port 12, such as 64 Kbps for example.

Figure 3:
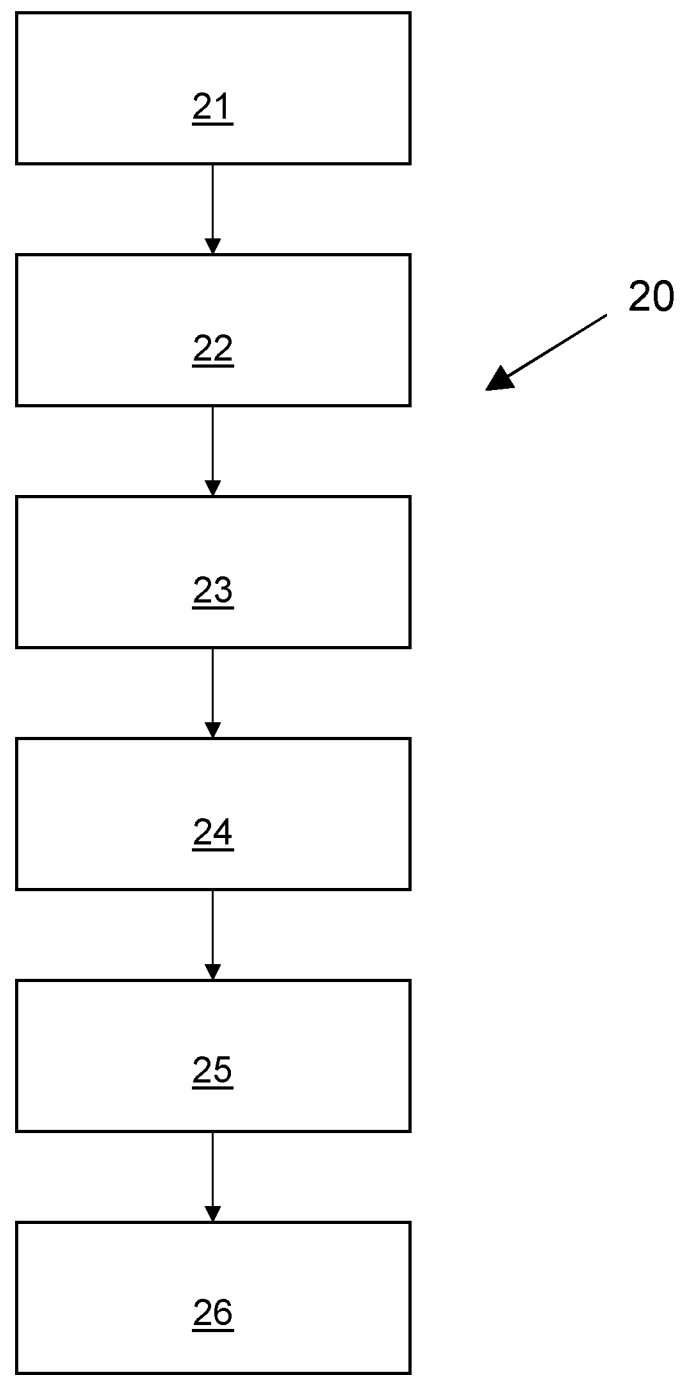

Referring to FIG. 3 of the drawings, there is illustrated a method 20 of communicating traffic received as a plurality of discrete traffic packets at an input, as a serial traffic stream to an output, for subsequent transmission over a serial communications link (not shown), such as a radio link. The method 20 comprises receiving packets of traffic, such as voice and data information, configured according to a communications protocol at a receiver, at step 21. The traffic is then subsequently forwarded to the buffer 16 of the FPGA 15 (at step 22) in accordance with a traffic request signal which is communicated from the buffer 16 to the receiver 14. The FPGA 15 subsequently converts the traffic packets to a serial traffic stream at step 23 in accordance with the programme which may be pre-set thereon, and if required processes the serialised traffic at step 25 in accordance with a processing scheme which may be uploaded from the library of traffic processing schemes, at step 24 using the control device 19. Once the traffic has been suitably serialised and processed, the serial traffic stream is then passed to an output of the FPGA 15 for subsequent transmission via the outlet port at step 26.

The present invention this enables information which is configured according to an IP protocol for example, to be reliably and securely communicated over a serial communications link.

What is claimed is:

1. A communication network traffic control element which is arranged to receive traffic as a plurality of discrete traffic packets at an input and communicate the traffic as a serial traffic stream to an output, the traffic control element comprising:

a receiver configured to receive discrete network traffic packets;

a plurality of processors operating in parallel and an output associated with each processor, each of the processors being configured to process the traffic packets to convert the traffic packets to a serial traffic stream and communicate the serial traffic stream to the associated output; and a buffer included in each of the processors, said buffer being configured for receiving traffic packets from the receiver in accordance with a traffic request signal which is communicated from the buffer to the receiver, and for controlling a rate of traffic packet flow from the receiver to the processor to enable a rate of serial traffic output from the processor to be varied independently of a rate of traffic packet input to the receiver.

2. The communication network traffic control element according to claim 1, further-comprising a library of traffic processing schemes which are selectively arranged to process the traffic before subsequent communication to the output.

3. The communication network traffic control element according to claim 2, wherein one or more of the traffic processing schemes are uploaded to the processors for traffic processing.

4. The communication network traffic control element according to claim 1, wherein the buffers are configured to temporarily hold the traffic packets from the receiver.

5. The communication network traffic control element according to claim 1, wherein each of the buffers comprises a temporary memory store.

6. The communication network traffic control element according to claim 5, further comprising a control device for controlling the traffic processing scheme which is to be applied to traffic.

7. The communication network traffic control element according to claim 6, wherein the control device is configured to selectively determine the processing schemes which are to be uploaded to the respective processors.

8. The communication network traffic control element according to claim 1, further comprising a control device for controlling the traffic processing scheme which is to be applied to traffic.

9. The communication network traffic control element according to claim 8, wherein the control device is configured to selectively determine the processing scheme which is to be uploaded to each of the respective processors.

10. The communication network traffic control element according to claim 1, wherein the processors are configured to convert traffic packets from the buffers to a serial traffic stream for subsequent communication to the outputs.

11. The communication network traffic control element according to claim 1, wherein at least one of the processors comprises a field programmable gate array.

12. The communication network traffic control element according to claim 11, wherein the communications protocol comprises an Internet Protocol or a Transmission Control Protocol, or a combination of both an Internet Protocol and a Trans mission Control Protocol.

13. The communication network traffic control element according to claim 1, wherein the discrete traffic packets comprise traffic configured according to a communications protocol.

14. The communication network traffic control element according to claim 1, wherein the traffic comprises packets which comprise data traffic or voice traffic or a combination of both.

15. A method of communicating traffic received as a plurality of discrete traffic packets at an input, to an output as a serial traffic stream, the method comprising:

receiving a plurality of discrete traffic packets at a receiver;

controlling a flow of traffic from the receiver to a buffer associated with a processor, said processor being one of a plurality of processors operating in parallel, an output being associated with each processor, said flow of traffic from the receiver to the buffer being in accordance with a traffic request signal which is communicated from the buffer to the receiver;

converting the discrete traffic packets to a serial traffic stream using the processors; and communicating the traffic from the processor to its associated output at a traffic flow rate independently of a traffic flow rate into the receiver.

16. The method according to claim 15, further comprising maintaining the buffer as a temporary memory store, such that as traffic is taken therefrom by the processor, further traffic is arranged to pass from the receiver into the buffer.

17. The method according to claim 15, further comprising communicating the traffic request signal to the receiver in dependence on an availability of memory space within the buffer.

* * * * *